(12) United States Patent
Sun (10) Patent No.: US 12,153,234 B2
(45) Date of Patent: Nov. 26, 2024

(54) PRIVACY FILM AND SPLICE PANEL

(71) Applicant: TCL CHINA STAR OPTOELECTRONICS TECHNOLOGY CO., LTD., Guangdong (CN)

(72) Inventor: Hejing Sun, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,984

(22) PCT Filed: Jun. 29, 2022

(86) PCT No.: PCT/CN2022/102366
§ 371 (c)(1),
(2) Date: Jul. 18, 2022

(87) PCT Pub. No.: WO2023/231119
PCT Pub. Date: Dec. 7, 2023

(65) Prior Publication Data
US 2024/0184023 A1 Jun. 6, 2024

(30) Foreign Application Priority Data
May 31, 2022 (CN) .......................... 202210611814.3

(51) Int. Cl.
*G09F 9/302* (2006.01)
*G02B 5/18* (2006.01)
(Continued)

(52) U.S. Cl.
CPC ....... *G02B 5/1819* (2013.01); *G02F 1/13336* (2013.01); *G02F 1/133504* (2013.01); *G09F 9/302* (2013.01)

(58) Field of Classification Search
CPC ............... G02B 5/1819; G02F 1/13336; G02F 1/133504; G09F 9/302
See application file for complete search history.

(56) References Cited

U.S. PATENT DOCUMENTS
2002/0163728 A1 11/2002 Myers

FOREIGN PATENT DOCUMENTS
CN  108493223 A  9/2018
CN  209191400 U  8/2019
(Continued)

OTHER PUBLICATIONS
International Search Report in International application No. PCT/CN2022/102366, mailed on Dec. 19, 2022.
(Continued)

*Primary Examiner* — Donald L Raleigh
(74) *Attorney, Agent, or Firm* — PV IP PC; Wei Te Chung (57) ABSTRACT

Embodiments of the present application disclose a privacy film and splice panel. The privacy film comprises a substrate and a grating layer, wherein the grating layer is disposed on the substrate, the grating layer comprises a plurality of grating units, and each of the plurality of grating units comprises a plurality of gratings. In the grating unit, the plurality of gratings are spaced apart, and the plurality of gratings are sequentially arranged to form a polygonal structure. Two adjacent grating units share at least one grating.

20 Claims, 8 Drawing Sheets

(51) Int. Cl.
*G02F 1/1333* (2006.01)
*G02F 1/1335* (2006.01)

(56) References Cited

FOREIGN PATENT DOCUMENTS

| CN | 209525640 U | 10/2019 |
|---|---|---|
| CN | 111239870 A | 6/2020 |
| CN | 111290056 A | 6/2020 |
| CN | 111323982 A | 6/2020 |
| CN | 111458923 A | 7/2020 |
| CN | 112310182 A | 2/2021 |
| CN | 112848581 A | 5/2021 |
| CN | 113270049 A | 8/2021 |
| CN | 113325632 A | 8/2021 |
| CN | 113485047 A | 10/2021 |
| CN | 214937180 U | 11/2021 |
| CN | 215730616 U | 2/2022 |
| CN | 114137753 A | 3/2022 |
| CN | 114335072 A | 4/2022 |
| CN | 114966928 A | 8/2022 |
| CN | 114973982 A | 8/2022 |
| JP | 2005107306 A | 4/2005 |
| JP | 2013205513 A | 10/2013 |

OTHER PUBLICATIONS

Written Opinion of the International Search Authority in International application No. PCT/CN2022/102366, mailed on Dec. 19, 2022.
International Search Report in International application No. PCT/CN2022/101068, mailed on Dec. 21, 2022.
Written Opinion of the International Search Authority in International application No. PCT/CN2022/101068, mailed on Dec. 21, 2022.
Chinese Office Action issued in corresponding Chinese Patent Application No. 202210611826.6 dated May 19, 2023, pp. 1-8.
Chinese Office Action issued in corresponding Chinese Patent Application No. 202210611814.3 dated May 16, 2023, pp. 1-7.

PRIVACY FILM AND SPLICE PANEL

TECHNICAL FIELD

The present application relates to a technical field of display technology, and in particular, to a privacy film and a splice panel.

BACKGROUND

In a splice panel with a liquid crystal panel and a LED (light-emitting diode) panel, an overall quality of a side view of the splice panel is affected due to a greater side-view brightness of the LED panel.

During research and practice to the prior art, the inventors of the present application have found that if the LED panel is attached with the existing privacy film, the side view of the LED panel at a certain angle (a large angle) will be black.

Technical Problems

Embodiments of the present application provide a privacy film and a splice panel, which can reduce side-view brightness.

SUMMARY

Embodiments of the present application provide a privacy film comprising:
  a substrate;
  a plurality of grating units disposed on the substrate on a same layer, wherein each of the plurality of grating units comprise a plurality of gratings;
  wherein in the grating unit, the plurality of gratings are spaced apart, and the plurality of gratings are sequentially arranged to form a polygonal structure;
  wherein two adjacent grating units share at least one grating.

Alternatively, in some embodiments of the present application, the privacy film has a plurality of optical channels.

Alternatively, in some embodiments of the present application, grating shared by two adjacent grating units is a common grating;
  the grating unit includes a first grating and a second grating, the first grating is adjacent to an end of the common grating, and the second grating is adjacent to another end of the common grating;
  in two adjacent said grating units, a first opening is provided between two adjacent first gratings, and a second opening is provided between two adjacent second gratings;
  the common grating is correspondingly disposed between the first opening and the second opening, and the first opening and the second opening at least partially correspond to form an optical channel.

Alternatively, in some embodiments of the present application, a width of the common grating is less than a width of the first opening and a width of the second opening.

Alternatively, in some embodiments of the present application, the first opening has a first center, the second opening has a second center, and a line connecting the first center and the second center closest to the first center coincides with a central axis of an extending direction of the common grating.

Alternatively, in some embodiments of the present application, the width of the first opening is equal to the width of the second opening.

Alternatively, in some embodiments of the present application, in a same grating unit, a distance is provided between two adjacent gratings, and any two distances are equal; wherein the plurality of gratings are sequentially arranged to form a regular polygonal structure.

Alternatively, in some embodiments of the present application, the plurality of grating units comprise a plurality of first grating units and a plurality of second grating units; wherein in each of the plurality of first grating units, the plurality of gratings are sequentially arranged to form an inverted equilateral triangle structure; wherein in each of the plurality of second grating units, the plurality of gratings are sequentially arranged to form an equilateral triangle structure;
  the first grating units and the second grating units are alternately arranged in a first direction; and the first grating units and the second grating units are alternately arranged in a second direction intersecting the first direction;
  the first grating unit and the second grating unit share at least one grating.

Alternatively, in some embodiments of the present application, the plurality of gratings include a plurality of first arrangement gratings, a plurality of second arrangement gratings, and a plurality of third arrangement gratings;
  in the first direction, extending directions of the first arrangement gratings are parallel to the first direction, and the plurality of first arrangement gratings are spaced apart; in a third direction intersecting the first direction, extending directions of the second arrangement gratings are parallel to the third direction, and the plurality of second arrangement gratings are spaced apart; in a fourth direction intersecting the third direction, extending directions of the third arrangement gratings are parallel to the fourth direction, and the plurality of third arrangement gratings are spaced apart;
  in the first direction, the optical channels are provided on both sides of each row of the first arrangement gratings; in the third direction, the optical channels are provided on both sides of each row of the second arrangement gratings; and in the fourth direction, the optical channels are provided on both sides of each row of the third arrangement gratings.

Alternatively, in some embodiments of the present application, in the grating unit, the plurality of the gratings are sequentially arranged to form a square structure;
  in a first direction, the plurality of grating units are spaced apart; and in a second direction perpendicular to the first direction, the plurality of grating units are spaced apart;
  in the first direction and the second direction, two adjacent grating units share at least one grating.

Alternatively, in some embodiments of the present application, the plurality of gratings include a plurality of first arrangement gratings and a plurality of second arrangement gratings, wherein in a first direction, extension directions of the first arrangement gratings are parallel to the first direction, and the plurality of first arrangement gratings are spaced apart; wherein in a second direction, extending directions of the second arrangement gratings are parallel to the second direction, and the plurality of second arrangement gratings are spaced apart;
  in the first direction, the optical channels are provided on both sides of each row of the first arrangement gratings; in the second direction, the optical channels are provided on both sides of each row of the second arrangement gratings; in a third direction intersecting the second direction, the optical channels are disposed between the first arrangement gratings and the second arrangement gratings; in a fourth direction perpendicular to the third direction, the optical channels are disposed between the first arrangement gratings and the second arrangement gratings.

Alternatively, in some embodiments of the present application, in the grating unit, the plurality of gratings are sequentially arranged to form a regular hexagonal structure; and the plurality of grating units include a plurality of first grating units and a plurality of second grating units;

the first grating units and the second grating units are alternately arranged in a first direction, and the first grating units and the second grating units are partially overlapped and relatively offset; wherein the plurality of first grating units and the plurality of second grating units are arranged in a second direction perpendicular to the first direction;

in the first direction, the first grating unit and the second grating share at least one grating; and in the second direction, two adjacent first grating units share at least one grating, and two adjacent second grating units share at least one grating.

Alternatively, in some embodiments of the present application, the plurality of gratings include a plurality of first arrangement gratings, a plurality of second arrangement gratings, and a plurality of third arrangement gratings;

in the first direction, extending directions of the first arrangement gratings are parallel to the first direction, and the plurality of first arrangement gratings are spaced apart; and in the second direction, the plurality of first arrangement gratings are spaced apart;

in a third direction intersecting the first direction, extending directions of the second arrangement gratings are parallel to the third direction, the plurality of second arrangement gratings are spaced apart; and in a fourth direction perpendicular to the third direction, the plurality of second arrangement gratings are spaced apart;

in a fifth direction intersecting the first direction, extending directions of the third arrangement gratings are parallel to the fifth direction, and the plurality of third arrangement gratings are spaced apart; and in a sixth direction perpendicular to the fifth direction, the plurality of third arrangement gratings are spaced apart;

in the first direction, the optical channels are provided on both sides of each row of the first arrangement gratings; in the second direction, the optical channels are provided on both sides of each row of the first arrangement gratings; in the third direction, the optical channels are provided on both sides of each row of the second arrangement gratings; in the fourth direction, the optical channels are provided on both sides of each row of the second arrangement gratings; in the fifth direction, the optical channels are provided on both sides of each row of the third arrangement gratings; and in the sixth direction, the optical channels are provided on both sides of each row of the third arrangement gratings.

Alternatively, in some embodiments of the present application, in a same grating unit, a distance is provided between two adjacent gratings; any adjacent distances are not equal, and the plurality of gratings are sequentially arranged to form a rhombic structure.

Alternatively, in some embodiments of the present application, the plurality of grating units comprise a plurality of first grating units and a plurality of second grating units; wherein in each of the plurality of first grating units, the plurality of gratings are sequentially arranged to form a first rhombic structure; and in each of the plurality of second grating units, the plurality of gratings are sequentially arranged to form a second rhombic structure;

the plurality of first grating units and the plurality of second grating units are arranged in a first direction; and the first grating units and the second grating units are alternately arranged in a second direction intersecting the first direction;

in the first direction, two adjacent first grating units share at least one grating, and two adjacent second grating units share at least grating; and in the second direction, the first grating unit shares at least one grating with the second grating unit;

in the second direction, a shape of the first grating unit and a shape of the second grating unit are symmetrical about a central axis of the common grating.

Alternatively, in some embodiments of the present application, the plurality of gratings include a plurality of first arrangement gratings, a plurality of second arrangement gratings, and a plurality of third arrangement gratings;

in the first direction, extending directions of the first arrangement gratings are parallel to the first direction, the plurality of first arrangement gratings are spaced apart, the plurality of second arrangement gratings are spaced apart, and the plurality of third arrangement gratings are spaced apart;

in a third direction intersecting the first direction, extending directions of the second arrangement gratings are parallel to the third direction, the plurality of first arrangement gratings are spaced apart, and the plurality of second arrangement gratings are spaced apart;

in a fourth direction intersecting the third direction, extending direction of the third arrangement gratings are parallel to the fourth direction, the plurality of first arrangement gratings are spaced apart, and the plurality of third arrangement gratings are spaced apart;

in the first direction, the optical channels are provided on both sides of each row of the first arrangement gratings, both sides of each row of the second arrangement gratings are provided with the optical channels, and both sides of each row of the third arrangement gratings are provided with the optical channels;

in the third direction, the optical channels are provided on both sides of each row of the first arrangement gratings, and the optical channels are provided on both sides of each row of the second arrangement gratings;

in the fourth direction, the optical channels are provided on both sides of each row of the first arrangement gratings, and the optical channels are provided on both sides of each row of the third arrangement gratings.

Alternatively, in some embodiments of the present application, any two adjacent grating units share at least one grating.

Accordingly, embodiments of the present application further provide a splice panel comprising:

at least two first panels, wherein the at least two first panels are spliced, and a gap is provided between two adjacent first panels; and at least one second panel disposed on light-emitting surfaces or light-entering surfaces of two adjacent first panels and blocking the gap;

wherein the second panel includes a panel body and a privacy film disposed on the panel body; a side-view brightness of the panel body is greater than a side-view brightness of the first panel;

an extending direction of the optical channel is intersected with an extending direction of the gap.

The privacy film comprises:

a substrate; and a plurality of grating units disposed on the substrate on a same layer, wherein each of the plurality of grating units comprise a plurality of gratings;

wherein in the grating unit, the plurality of gratings are spaced apart, and the plurality of gratings are sequentially arranged to form a polygonal structure;

wherein two adjacent grating units share at least one grating.

Alternatively, in some embodiments of the present application, a grating shared by two adjacent grating units is a common grating;

the grating unit includes a first grating and a second grating, the first grating is adjacent to an end of the common grating, and the second grating is adjacent to another end of the common grating;

in two adjacent said grating units, a first opening is provided between two adjacent first gratings, and a second opening is provided between two adjacent second gratings;

the common grating is correspondingly disposed between the first opening and the second opening, and the first opening and the second opening at least partially correspond to form an optical channel;

an extending direction of the optical channel is intersected with an extending direction of the gap.

Alternatively, in some embodiments of the present application, a width of the common grating is less than a width of the first opening and a width of the second opening.

Alternatively, in some embodiments of the present application, the first opening has a first center, the second opening has a second center, and a line connecting the first center and the second center closest to the first center coincides with a central axis of an extending direction of the common grating.

Alternatively, in some embodiments of the present application, the width of the first opening is equal to the width of the second opening.

Alternatively, in some embodiments of the present application, in a same grating unit, a distance is provided between two adjacent gratings, and any two of the distances are equal; wherein the plurality of the gratings are sequentially arranged to form a regular polygon structure.

Embodiments of the present application provide a privacy film comprising a substrate and a grating layer. The grating layer is disposed on the substrate, and the grating layer comprises a plurality of grating units. Each of the plurality of the grating units comprises a plurality of gratings. In the grating unit, the plurality of gratings are spaced apart, and the plurality of gratings are sequentially arranged to form a polygonal structure. Two adjacent grating units share at least one grating.

Beneficial Effects

The privacy film and splice panel of the embodiment of the present application includes a plurality of grating units arranged with a plurality of grating spaced apart. Since the plurality of gratings are spaced apart, an opening is provided between adjacent gratings. The opening allow the lights to pass through. The privacy film of the present embodiment improves the side-view brightness compared to the grating strip provided with no opening in the prior art.

When the grating unit provides with an optical channel, the side-view display effect can be improved. In addition, two adjacent grating units share at least one grating, so that the layout space of the grating can be saved to provide more gratings, and the front-side brightness can be further reduced.

BRIEF DESCRIPTION OF THE DRAWINGS

In order to more clearly describe the technical solutions in the embodiments of the present application, the accompanying drawings required in the description of the embodiments will be briefly described below. It is obvious that the accompanying drawings in the following description are merely some embodiments of the present application, and other drawings may be obtained by those skilled in the art without creative efforts.

DETAILED DESCRIPTION OF THE EMBODIMENTS

The technical solutions in the embodiments of this application will be clearly and completely described below in conjunction with the accompanying drawings in the embodiments of this application. It is clear that the described embodiments are only some but not all of the embodiments of this application. Based on the embodiments of the present application, all other embodiments obtained by a person skilled in the art without creative efforts are within the scope of the present application. In addition, it should be understood that the specific embodiments described herein are merely intended to illustrate and explain the present application, and are not intended to limit the present application. In the present application, unless otherwise stated, the directional words used such as "upper" and "lower" generally refer to the upper and lower sides of the device in actual use or working state, specifically the drawing direction in the accompanying drawings; while "inside" and "outside" refer to the outline of the device.

Embodiments of the present application provide a privacy film and a splice panel, which are described in detail below. It should be noted that the order of description of the following embodiments is not a limit on the preferred order of the embodiments.

It should be noted that the description of the brightness of the privacy film in the following embodiments is explained when the privacy film is applied to the display panel.

Figure 1:
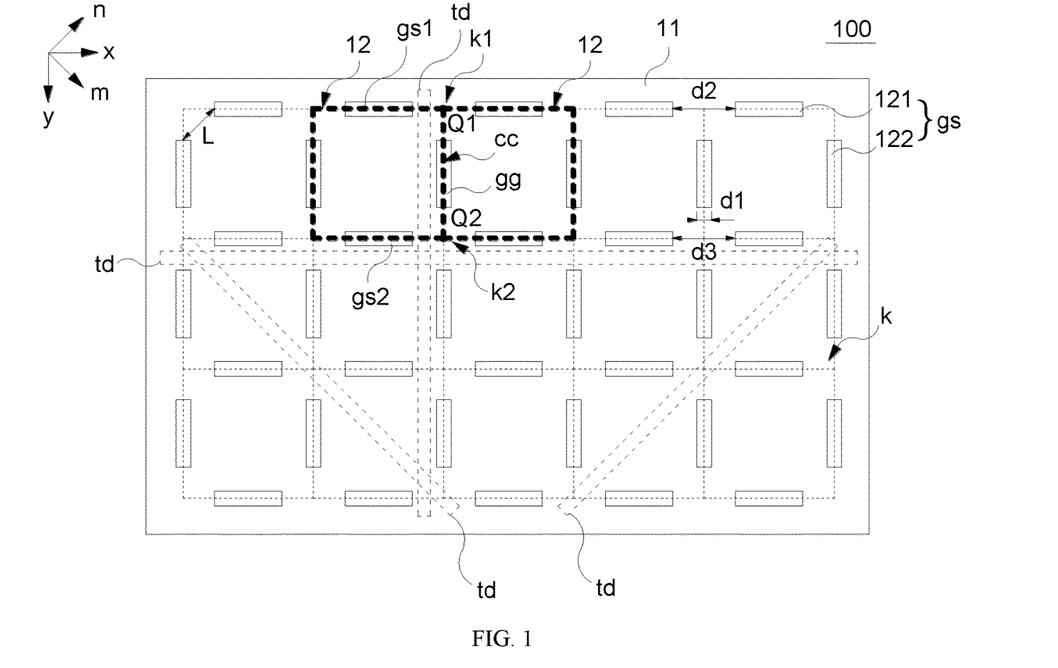
FIG. 1 is a schematic diagram of a top view structure of a privacy film according to a first embodiment of the present application.

Referring to FIG. 1, a first embodiment of the present application provides a privacy film 100 including a substrate 11 and a plurality of grating units 12.

The plurality of grating units 12 are disposed on the substrate 11 on a same layer. Each of the plurality of grating units 12 includes a plurality of gratings gs.

In the grating unit, the plurality of gratings gs are spaced from each other, and the plurality of gratings gs are sequentially arranged to form a polygonal structure.

Two adjacent grating units 12 share at least one grating gs.

The privacy film 100 of the first embodiment of the present application includes a plurality of grating units 12 having a plurality of gratings gs spaced apart, and the plurality of grating units 12 are arranged horizontally and vertically. The plurality of gratings gs are spaced from each other, that is, openings k are provided between adjacent gratings gs. When the privacy film 100 is applied to the panel, part of the lateral lights are allowed to pass through the openings k, and part of the lateral lights are blocked by the gratings gs to reduce side-view brightness, but the side-view brightness is not zero. Compared with the prior art in which the grating bar is not provided with an opening, the privacy film of the present embodiment improves the side-view brightness.

In addition, since the two adjacent grating units 12 share at least one grating gs, the layout space of the gratings gs can be saved to provide more grating units 12 and further reduce front-view brightness.

It should be noted that, in the grating unit 12, central axes of the plurality of gratings gs are sequentially intersected and connected to form a closed-loop structure as a polygonal structure, as shown in FIG. 1.

Alternatively, in the first embodiment, the privacy film 100 has a plurality of optical channels td. The extending directions of the plurality of optical channels td are different. The privacy film 100 is provided with a plurality of optical channels td to compensate for the uniformity of the peripheral side-view brightness and improve the side-view display effect.

In some embodiments, the extending directions of optical channels td in the privacy film 100 may also be consistent.

Alternatively, the material of the substrate 11 may be a hard substrate or a flexible substrate. The material of the substrate 11 includes one of glass, sapphire, silicon, silicon dioxide, polyethylene, polypropylene, polystyrene, polylactic acid, polyethylene dicarboxylate, polyethylene terephthalate, polyethylene naphthalate, polycarbonate, polyethersulfone, aromatic fluorotoluene containing polyarylate, polycyclic olefin, polyimide or polyurethane.

Alternatively, the material of the grating gs may be a black light-opaque material, for example, an inorganic metal material such as Cr (chromium), Mo (molybdenum), Mn (manganese), or the like, or a metal oxide material such as CrOx, MoOx, MnO2, or the like, or a mixed material formed of a metal and a metal oxide. The material of the grating gs may also be an organic black resin material such as black polystyrene, black photoresist, or the like.

Alternatively, the shape of the grating gs may be rectangular, trapezoidal or other.

Alternatively, the width of the grating gs is greater than or equal to 8 µm, such as 8 µm, 9 µm, or 10 µm. The length of the grating gs is ranging from 30 µm to 75 µm, such as 30 µm, 35 µm, 45 µm, 55 µm, 65 µm or 75 µm. The thickness of the grating gs is ranging from 50 µm to 130 µm, such as 50 µm, 60 µm, 70 µm, 80 µm, 90 µm, 100 µm, 110 µm or 130 µm.

Alternatively, a grating between two adjacent grating units 12 of the first embodiment is a common grating gg.

The grating unit 12 includes a first grating gs1 and a second grating gs2. The first grating gs1 is adjacent to an end of the common grating gg, and the second grating gs2 is adjacent to another end of the common grating gg.

In two adjacent grating units, a first opening k1 is provided between two first gratings gs1, and a second opening k2 is provided between two second gratings gs2.

The common grating gg is correspondingly disposed between the first opening k1 and the second opening k2. The first opening k1 and the second opening k2 at least partially correspond to form the optical channel td.

Alternatively, the width d1 of the common grating gg is less than the width d2 of the first opening k1 and the width d3 of the second opening k2. As such, the common grating gg can be disposed in a region corresponding to the widths of the first opening k1 and the second opening k2, and the optical channel td can be formed without an offset arrangement.

Figure 2:
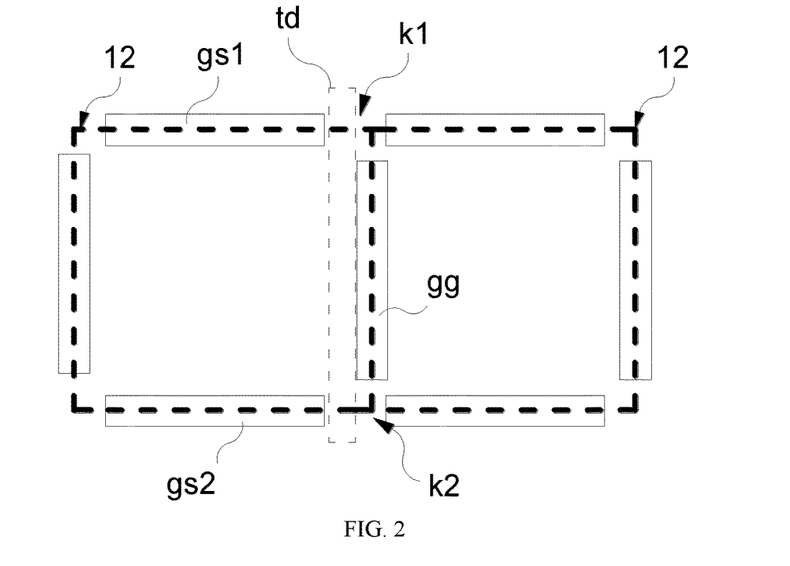
FIG. 2 is a schematic diagram of another top view structure of two adjacent grating units of a privacy film according to a first embodiment of the present application.

For example, in some embodiments, when the width of the common grating gg is equal to or greater than the width of the first opening k1 and the second opening k2, it is necessary to offset the common grating gg to avoid blocking the optical channel td. The common grating gg is disposed on a same side of the first opening k1 and the second opening k2, and the other side of the first opening k1 and the second opening k2 forms the optical channel td, as shown in FIG. 2.

Alternatively, the first opening k1 has a first center Q1. The second opening k2 has a second center Q2. The line connecting the first center Q1 and the second center Q2, which are closest to each other, coincides with the extending direction of the axis cc of the common grating gg.

The optical channels formed by the plurality of first opening k1 and the plurality of second openings k2 are divided into two small optical channels td by the common grating gg to improve the uniformity of light passage.

Alternatively, the width of the first opening k1 is equal to the width of the second opening k2, so that the light flux of the optical channel td tends to be uniform, and thereby improving uniformity of light emission.

Alternatively, in the first embodiment, any two adjacent grating units share at least one grating gs.

In some embodiments, most part of adjacent grating units 12 shares at least one grating gs, while other part of adjacent grating units 12 do not share the grating gs.

For example, the grating units 12 located in a middle region of the substrate 11 are spaced apart, and the common grating gs is provided between the grating units 12 in two side regions of the substrate 11. The number of grating units 12 in the middle region is less than the number of grating units 12 in the two side regions, so that a gradient trend of decreasing front-view brightness is achieved.

Alternatively, in the first embodiment, there is a distance L between two adjacent gratings gs, and any two distances L are equal. A plurality of gratings gs are sequentially arranged to form a regular polygonal structure.

It should be noted that in a grating unit 12, central axes of the plurality of gratings gs are sequentially intersected and connected to form a closed-loop structure as a polygonal structure, as shown in FIG. 1.

The distance L is a distance between centers of the adjacent ends of the adjacent two gratings gs in a same grating unit gs.

Alternatively, in the grating unit 12 of the first embodiment, the plurality of gratings gs are sequentially arranged to form a square structure.

In a first direction x, the plurality of grating units 12 are spaced. In a second direction y perpendicular to the first direction x, the plurality of grating units 12 are spaced.

In the first direction x and the second direction y, the two adjacent grating units 12 share at least one grating gs.

Alternatively, the plurality of gratings gs includes a plurality of first arrangement gratings 121 and a plurality of second arrangement gratings 122. In the first direction x, the extending direction of the first arrangement grating 121 is parallel to the first direction x, and the plurality of first arrangement gratings 121 are spaced. In the second direction y, the extending direction of the second arrangement grating 122 is parallel to the second direction y, and the plurality of second arrangement gratings 122 are spaced.

In the first direction x, optical channels td are provided on both sides of each row of the first arrangement gratings 121. In the second direction y, optical channels td are provided on both sides of each row of the second arrangement gratings 122. In a third direction m intersecting the second direction y, optical channels td are provided between the first arrangement gratings 121 and the second arrangement gratings 122. In a fourth direction n perpendicular to the third direction m, optical channels td are provided between the first arrangement gratings 121 and the second arrangement gratings 122.

Figure 3:
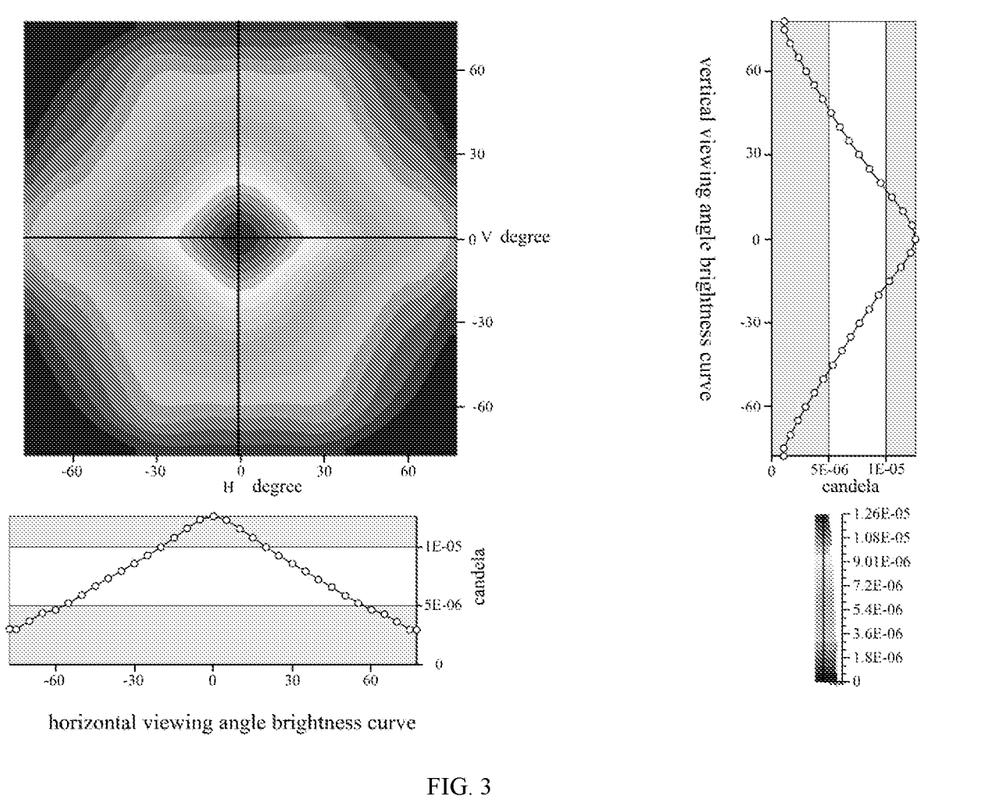
FIG. 3 is a schematic diagram of a pseudo-true viewing angle-brightness of a privacy film according to a first embodiment of the present application.

Referring to FIG. 3, it should be noted that FIG. 3 is a pseudo-true schematic diagram in which taking the privacy film 100 of the first embodiment applied to an LED panel as an example.

The present first embodiment provides a plurality of optical channels td in the first direction x and the second direction y such that the side-view brightness of the privacy film 100 in the first direction x and the second direction y tends to be balanced when the privacy film 100 is applied to the panel. It can be seen from FIG. 3 that the brightness curves of the privacy film 100 tend to coincide with each other in the horizontal viewing angle and the vertical viewing angle.

The first embodiment provides a plurality of optical channels td in the third direction m and the fourth direction n to increase the luminance brightness of the oblique viewing angle so that the brightness of the oblique viewing angle is as consistent as possible with the brightness of the horizontal viewing angle and the vertical viewing angle, respectively.

Figure 4:
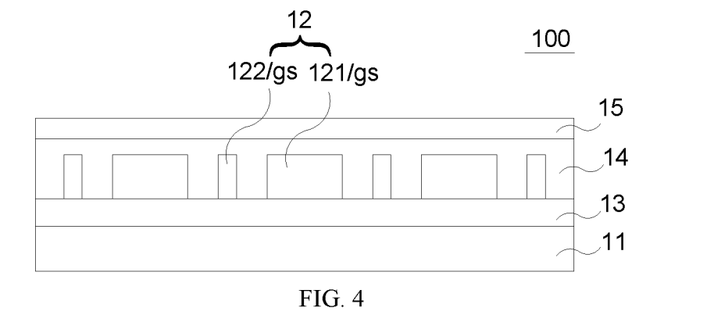
FIG. 4 is a schematic diagram of a side view structure of a privacy film according to a first embodiment of the present application.

Alternatively, referring to FIG. 4, the privacy film 100 further includes a first adhesive layer 13, a second adhesive layer 14, and a protective layer 15. The first adhesive layer 13 is disposed on the substrate 11. The grating units 12 are disposed on the first adhesive layer 13. The second adhesive layer 14 is disposed on the grating units 12. The protective layer 15 is disposed on the second adhesive layer.

The gratings gs in the privacy film 100 are formed by a punching process.

Figure 5:
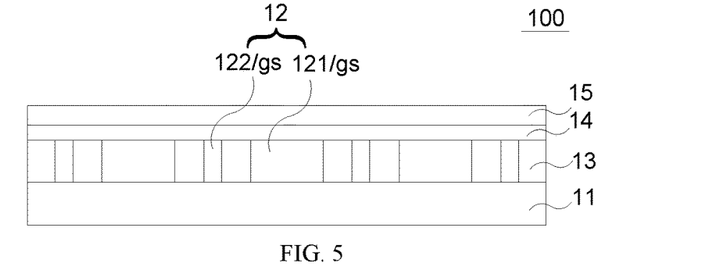
FIG. 5 is a schematic diagram of another side view structure of a privacy film according to a first embodiment of the present application.

In another structure of the first embodiment of the present application, referring to FIG. 5, the privacy film 100 also includes a first adhesive layer 13, a second adhesive layer 14, and a protective layer 15. The first adhesive layer 13 is disposed on the substrate 11. The first adhesive layer 13 defines a plurality of receiving ports in which the grating units 12 are disposed. The second adhesive layer 14 covers the first adhesive layer 13 and the grating units 12. The protective layer 15 is disposed on the second adhesive layer 14.

The gratings gs in the privacy film 100 are formed by a transfer process.

Figure 6:
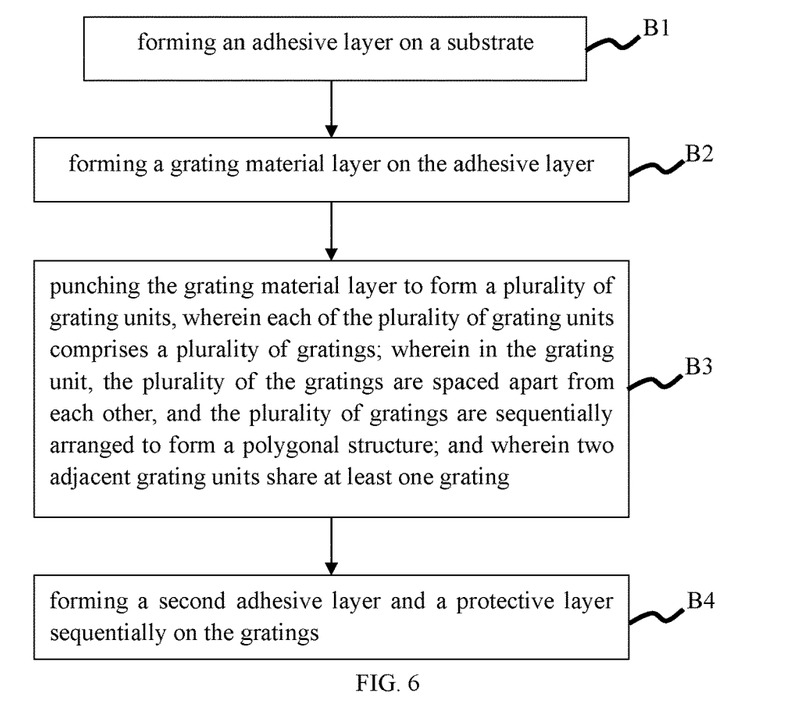
FIG. 6 is a flowchart of a preparation method of privacy film according to a first embodiment of the present application.

Accordingly, referring to FIG. 6, an embodiment of the present application further provides a preparation method of privacy film, comprising:

Step B1, forming an adhesive layer on a substrate.

Step B2, forming a grating material layer on the adhesive layer.

Step B3, punching the grating material layer to form a plurality of grating units. Each of the plurality of grating units comprises a plurality of gratings. In the grating unit, the plurality of the gratings are spaced apart from each other, and the plurality of gratings are sequentially arranged to form a polygonal structure. Two adjacent grating units share at least one grating.

In the preparation method of the embodiment of the present application, the plurality of gratings in the grating unit are spaced. When the privacy film 100 is applied to the panel, the side-view brightness is reduced. The adjacent grating units share at least one common grating, so that the layout space of the gratings can be saved, more grating units can be disposed in the privacy film, and further the front-view brightness is reduced.

In addition, the formation of the grating by the punching process is simpler than the transfer process. Even if two punching dies are used to pattern the grating material layer, all the gratings can be formed on a same layer, thereby thinning the thickness of the privacy film.

Hereinafter, the preparation method of the privacy film 100 of the first embodiment is described as an example, but is limited thereto.

Figure 7:
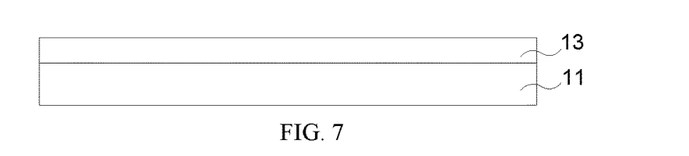
FIG. 7 is a schematic diagram of step B1 in a preparation method of privacy film according to a first embodiment of the present application.

In step B1, referring to FIG. 7, an adhesive layer is formed on the substrate 11. This adhesive layer is defined as the first adhesive layer 13.

Alternatively, the material of the substrate 11 may be a hard substrate or a flexible substrate. The material of the substrate 11 includes one of glass, sapphire, silicon, silicon dioxide, polyethylene, polypropylene, polystyrene, polylactic acid, polyethylene dicarboxylate, polyethylene terephthalate, polyethylene naphthalate, polycarbonate, polyethersulfone, aromatic fluorotoluene containing polyarylate, polycyclic olefin, polyimide or polyurethane.

The method then proceeds to step B2.

Figure 8:
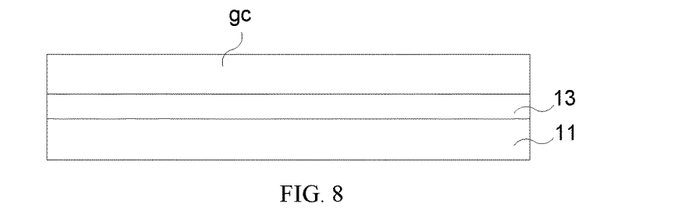
FIG. 8 is a schematic diagram of step B2 in a preparation method of privacy film according to a first embodiment of the present application.

In step B2, referring to FIG. 8, a grating material layer gc is formed on the adhesive layer.

Alternatively, the grating material layer gc may be bonded to the adhesive layer 13.

Alternatively, the material of the grating material layer gc may be a black light-opaque material, for example, an inorganic metal material such as Cr (chromium), Mo (molybdenum), Mn (manganese), or the like, or a metal oxide material such as CrOx, MoOx, MnO2, or the like, or a mixed material formed of a metal and a metal oxide. The material of the grating 12 may also be an organic black resin material such as black polystyrene, black photoresist, or the like.

The method then proceeds to step B3.

Figure 9:
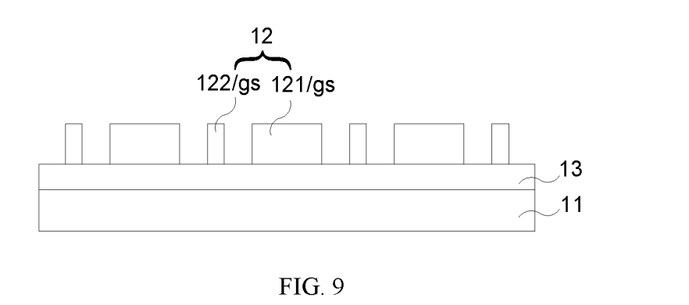
FIG. 9 is a schematic diagram of step B3 in a preparation method of privacy film according to a first embodiment of the present application.

In step B3, referring to FIG. 9, the grating material layer gc is punched to form a plurality of grating units 12. The grating unit 12 includes a plurality of gratings gs. In the grating unit 12, the plurality of gratings gs are spaced apart from each other, and the plurality of gratings gs are sequentially arranged to form a polygonal structure. Two adjacent grating units 12 share at least one grating gs.

Alternatively, step B3 includes the following.

In step B31, the grating material layer gc is punched by the first punching die c1 to form a plurality of first arrangement gratings 121;

In step B32, the grating material layer gc is punched by the first punching die c1 to form a plurality of second arrangement gratings 122. Two first arrangement gratings 121 and two second arrangement gratings 122 form a grating unit 12.

In step B33, portions of the grating material layer gc other than the first arrangement grating 121 and the second arrangement grating 122 are removed.

Figure 10:
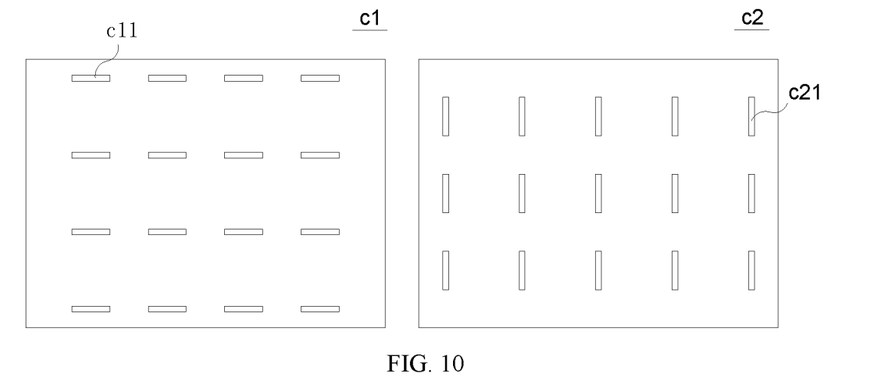
FIG. 10 is a schematic diagram of a first punching die and a second punching die in the preparation method of privacy film according to a first embodiment of the present application.

Referring to FIG. 10, the first punching die c1 is provided with first punching holes c11 patterned same as the plurality of first arrangement gratings 121. The second die c2 is provided with a second die hole c21 patterned same as the plurality of second arrangement gratings 122.

In some embodiments, the grating material gc may also be punched using a punching die to form a plurality of first arrangement gratings 121 and a plurality of second arrangement gratings 122. Anther punching dies are saved.

Figure 11:
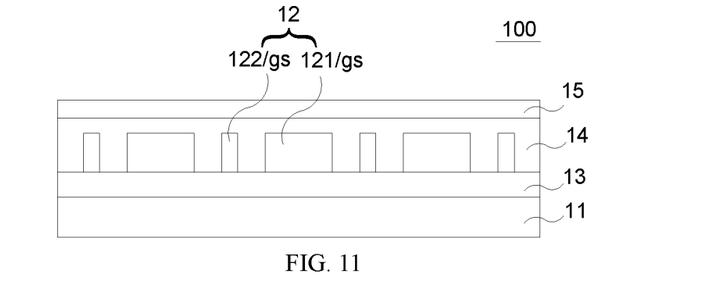
FIG. 11 is a schematic diagram of step B4 in a preparation method of privacy film according to a first embodiment of the present application.

The preparation method of privacy film 100 according to the embodiment of the present application further comprises step B4.

Referring to FIG. 11, a second adhesive layer 14 and a protective layer 15 are sequentially stacked on the grating unit 12.

Alternatively, the second adhesive layer 14 and the first adhesive layer 13 have same material. The second adhesive layer 14 is a transparent adhesive layer.

This preparation method of the privacy film 100 of the embodiment of the present application is achieved.

Figure 12:
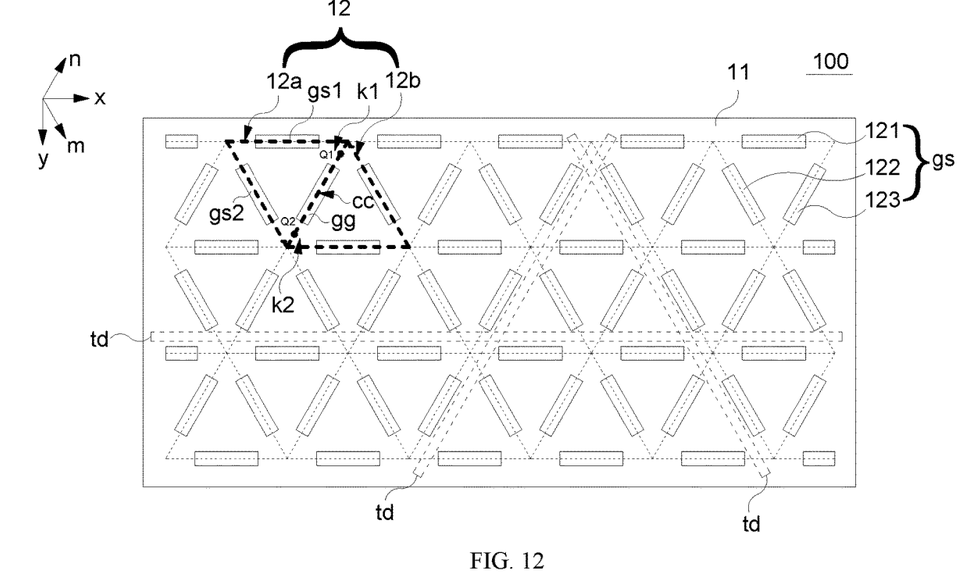
FIG. 12 is a schematic diagram of a top view structure of privacy film according to a second embodiment of the present application.

Referring to FIG. 12, the privacy film 100 of the second embodiment is different from the privacy film 100 of the first embodiment in that: the plurality of grating units 12 include a plurality of first grating units 12a and a plurality of second grating units 12b. In each of the plurality of first grating units 12a, a plurality of gratings gs are sequentially arranged to form an inverted equilateral triangle structure. In each of the plurality of second grating units 12b, a plurality of gratings gs are sequentially arranged to form an equilateral triangle structure.

In the first direction x, the first grating unit 12a and the second grating unit 12b are alternately arranged. In the second direction y intersecting the first direction x, the first grating unit 12a and the second grating unit 12b are alternately arranged.

The first grating unit 12a and the second grating unit 12b share at least one grating gs.

Alternatively, the plurality of gratings gs includes a first arrangement grating 121, a second arrangement grating 122, and a third arrangement grating 123.

In the first direction x, the extending direction of the first arrangement grating 121 is parallel to the first direction x, and a plurality of first arrangement gratings 121 are spaced apart. In the third direction m intersecting the first direction x, the extending direction of the second arrangement grating 122 is parallel to the third direction m, and a plurality of second arrangement gratings 122 are spaced apart. In the fourth direction n intersecting the third direction m, the extending direction of the third arrangement grating 123 is parallel to the fourth direction n, and a plurality of the third arrangement gratings 123 are spaced apart.

In the first direction x, optical channels td are provided on both sides of each row of the first arrangement gratings 121. In the third direction m, optical channels td are provided on both sides of each row of the second arrangement gratings 122. In the fourth direction n, optical channels td are provided on both sides of each row of the third arrangement gratings 123.

The privacy film 100 of the present second embodiment may be provided with more gratings gs than the privacy film 100 of the first embodiment, thereby further reducing the front-view brightness of the privacy film 100 of the second embodiment, and the side-view brightness from the vertical direction of the privacy film 100 of the second embodiment.

Figure 13:
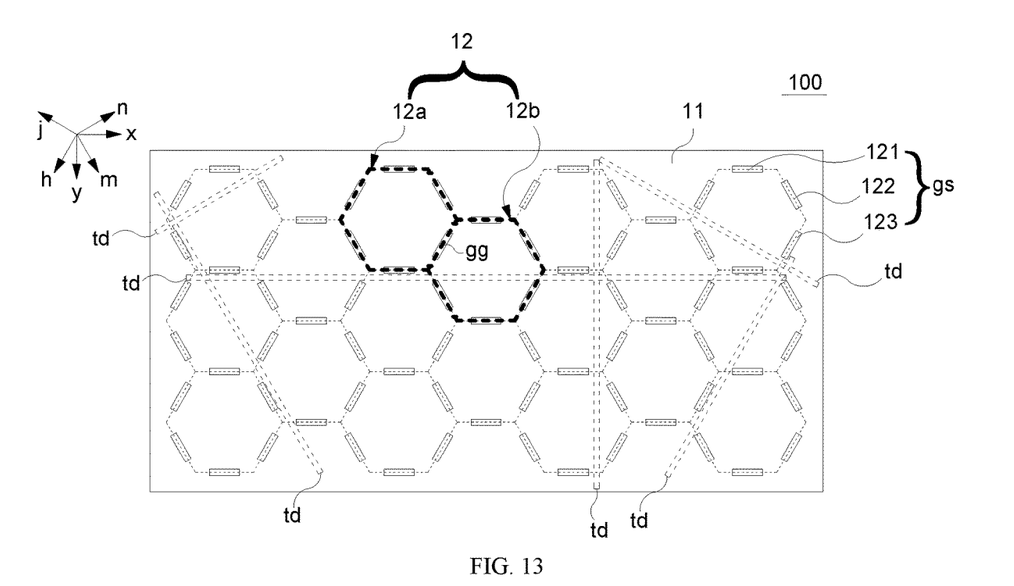
FIG. 13 is a schematic diagram of a top view structure of privacy film according to a third embodiment of the present application.

Referring to FIG. 13, the privacy film 100 of the third embodiment differs from the privacy film 100 of the first embodiment in that: in the grating unit 12, a plurality of gratings gs are sequentially arranged to form a regular hexagonal structure. The plurality of grating units 12 includes a plurality of first grating units 12a and a plurality of second grating units 12b.

In the first direction x, the first grating units 12a and the second grating units 12b are alternately arranged. The first grating unit 12a and the second grating unit 12b are partially overlapped and relatively offset. In the second direction y perpendicular to the first direction x, a plurality of first grating units 12a are arranged, and a plurality of second grating units 12b are arranged.

In the first direction x, the first grating unit 12a shares at least one grating gs with the second grating unit 12b. In the second direction y, two adjacent first grating units 12a share at least one grating gs, and two adjacent second grating units 12b share at least one grating gs.

Alternatively, the plurality of gratings gs includes a first arrangement grating 121, a second arrangement grating 122, and a third arrangement grating 123.

In the first direction x, the extending direction of the first arrangement grating 121 is parallel to the first direction x, and a plurality of first arrangement gratings 121 are spaced apart. In the second direction y, a plurality of first arrangement gratings 121 are spaced apart.

In the third direction m intersecting the first direction x, the extending direction of the second arrangement grating 122 is parallel to the third direction m, and a plurality of second arrangement gratings 122 are spaced apart. In the fourth direction n perpendicular to the third direction m, a plurality of second arrangement gratings 122 are spaced apart.

In the fifth direction h intersecting the first direction x, the extending direction of the third arrangement grating 123 is parallel to the fifth direction h, and a plurality of the third arrangement gratings 123 are spaced apart. In a sixth direction j perpendicular to the fifth direction h, a plurality of third arrangement gratings 123 are spaced apart.

In the first direction x, optical channels td are provided on both sides of each row of the first arrangement gratings 121. In the second direction y, optical channels td are provided on both sides of each row of the first arrangement gratings 121. In the third direction m, optical channels td are provided on both sides of each row of the second arrangement gratings 122. In the fourth direction n, optical channels td are provided on both sides of each row of the second arrangement gratings 122. In the fifth direction h, optical channels td are provided on both sides of each row of the third arrangement gratings 123. In the sixth direction j, optical channels td are provided on both sides of each row of the third arrangement gratings 123.

Figure 14:
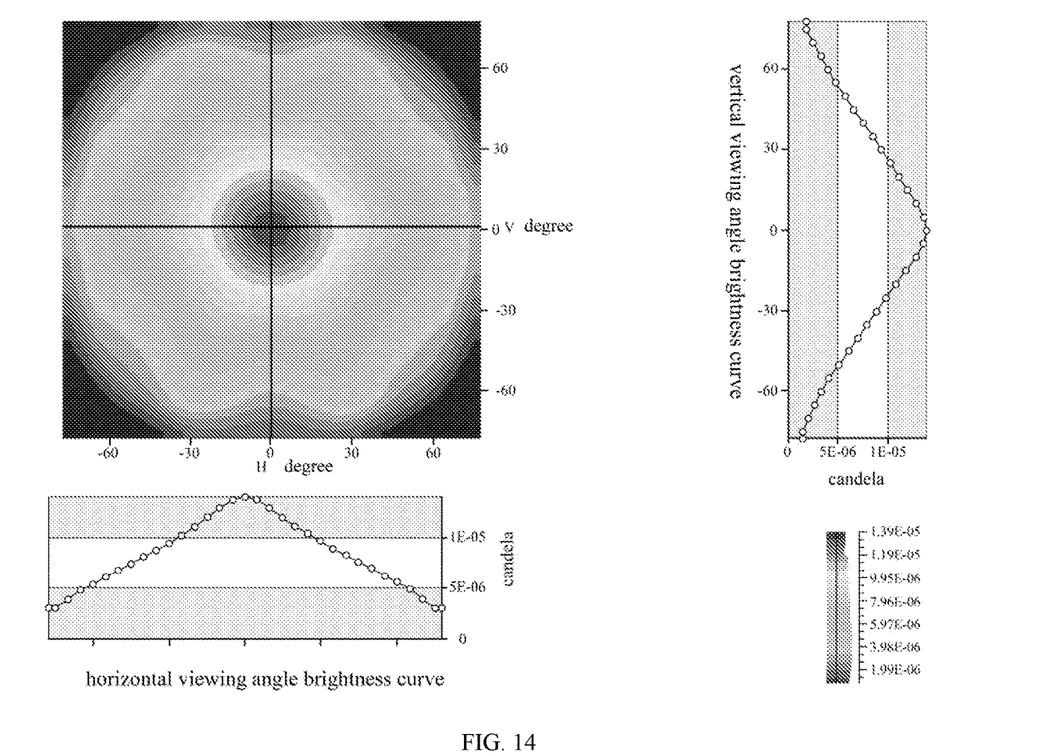
FIG. 14 is a schematic diagram of a pseudo-true viewing angle-brightness of a privacy film according to a third embodiment of the present application.

The privacy film 100 of the third embodiment is provided with more optical channels td than the privacy film 100 of the first embodiment. For example, a plurality of optical channels td are provided in the fifth direction h and the sixth direction j. Referring to FIG. 14, when the privacy film 100 is applied to the panel, the side-view brightness of the privacy film 100 in the first direction x and the second direction y tends to be balanced, that is, in the horizontal viewing angle and the vertical viewing angle, the brightness curves of the privacy film 100 tend to be coincided.

Since the six directions are uniformly distributed, and the light emission brightness of the oblique viewing angle is increased compared to the first embodiment, the brightness of the oblique viewing angle tends to approach the brightness of the horizontal viewing angle and the vertical viewing angle.

Figure 15:
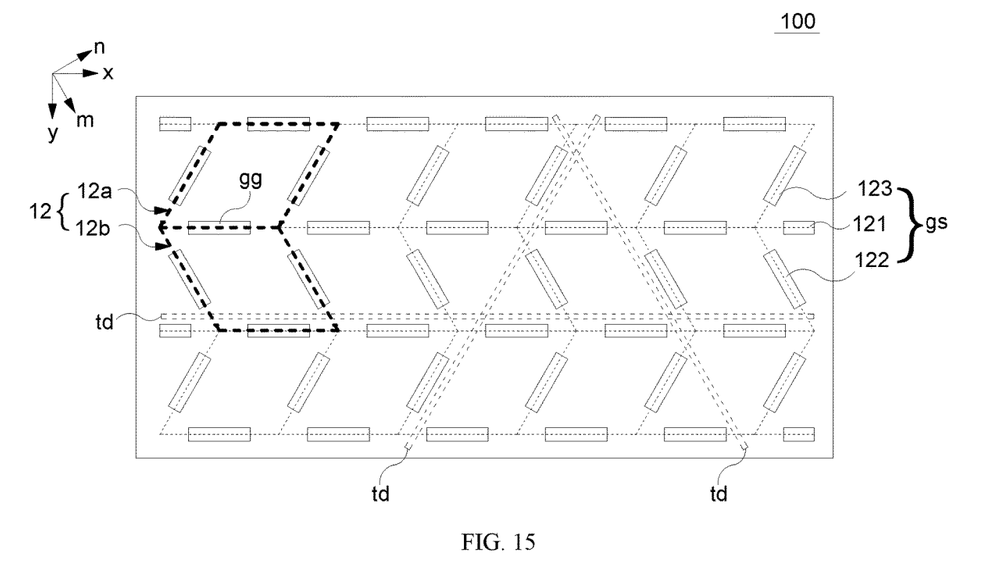
FIG. 15 is a schematic diagram of a top view structure of privacy film according to a fourth embodiment of the present application.

Referring to FIG. 15, the privacy film 100 according to the fourth embodiment differs from the privacy film 100 according to the first embodiment in that: in a same grating unit gs, there is a distance L between two adjacent gratings gs. The plurality of gratings gs are sequentially arranged to form a rhombic structure.

Alternatively, the plurality of grating units 12 includes a plurality of first grating units 12a and a plurality of second grating units 12b. In the first grating unit 12a, a plurality of gratings gs are sequentially arranged to form a first rhombic structure. In the second grating unit gs, a plurality of gratings gs are sequentially arranged to form a second rhombic structure.

In the first direction x, a plurality of first grating units 12a are sequentially arranged, and a plurality of second grating units 12b are sequentially arranged. In a second direction y intersecting the first direction x, the first grating unit 12a and the second grating unit 12b are alternately arranged.

Alternatively, the first direction x is perpendicular to the second direction y.

In the first direction x, two adjacent first grating units 12a share at least one grating gs, and two adjacent second grating units 12b share at least one grating gs. In the second direction y, the first grating unit 12a shares at least one grating gs with the second grating unit 12b.

In the second direction y, a shape of the first grating unit 12a and a shape of the second grating unit 12b are symmetrical about a central axis of the common grating gg.

Alternatively, the plurality of gratings gs includes a plurality of first arrangement gratings 121, a plurality of second arrangement gratings 122, and a plurality of third arrangement gratings 123.

In the first direction x, the extending direction of the first arrangement grating 121 is parallel to the first direction x, a plurality of first arrangement gratings 121 are spaced apart, a plurality of second arrangement gratings 122 are spaced apart, and a plurality of third arrangement gratings 123 are spaced apart.

In the third direction m intersecting the first direction x, the extending direction of the second arrangement grating 122 is parallel to the third direction m, a plurality of first arrangement gratings 121 are spaced apart, and a plurality of second arrangement gratings 122 are spaced apart.

In a fourth direction n intersecting the third direction m, the extending direction of the third arrangement grating 123 is parallel to the fourth direction n, a plurality of first arrangement gratings 121 are spaced apart, and a plurality of third arrangement gratings 123 are spaced apart.

In the first direction x, optical channels td are provided on both sides of each row of the first arrangement gratings 121.

In the third direction m, optical channels td are provided on both sides of each row of the second arrangement gratings 122.

In the fourth direction n, optical channels td are provided on both sides of each row of the third arrangement gratings 123.

Alternatively, the third direction m and the fourth direction n are both non-perpendicular to the first direction x.

In some embodiments, the shapes of the first grating unit 12a and the second grating unit 12b may be same on the basis of the fourth embodiment.

Figure 16:
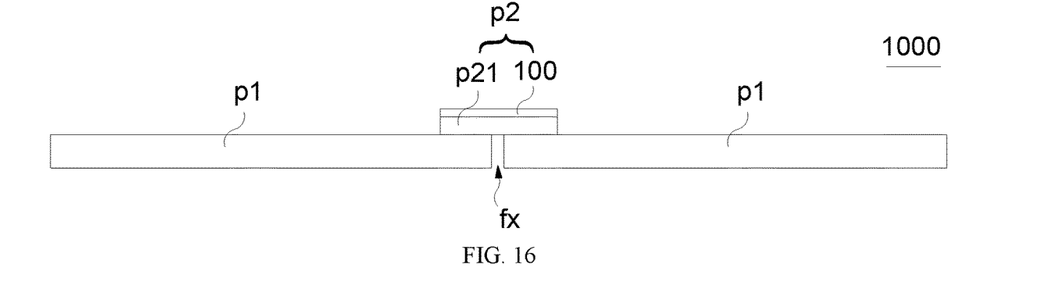
FIG. 16 is a schematic structural diagram of a splice panel according to an embodiment of the present application.

Referring to FIG. 16, an embodiment of the present application further provides a splice panel 1000 including at least two first panels p1 and at least one second panel p2.

At least two first panels p1 are spliced. There is a gap fx between two adjacent first panels P1.

The second panel p2 is disposed on the light-emitting surfaces of the two adjacent first panels p1 and shields the gap fx.

The second panel p2 includes a panel body p21 and a privacy film 100 as in any of the above embodiments. The privacy film 100 is disposed on the panel body p21. The side-view brightness of the panel body p21 is greater than the side-view brightness of the first panel p1.

The extending direction of the optical channel td is intersected with the extending direction of the gap fx.

The second panel p2 of the splice panel 1000 according to the embodiment of the present application is disposed on the panel body p21 using the privacy film 100, so that the side-view brightness and the front-view brightness of the second panel p2 are reduced, and the side-view brightness and the front-view brightness of the whole splice panel 1000 tend to be coincided.

The extending direction of the optical channel td is intersected with the extending direction of the gap fx to ensure that the side-view brightness of the second panel p2 is reduced. In the whole splice panel 1000, it is ensured that the side-view brightness of the second panel p2 is not zero.

Alternatively, the extending direction of the optical channel td is perpendicular to the extending direction of the gap fx, so that the extending direction of some optical channels coincides with the splicing direction. The splicing direction is perpendicular to the extending direction of the gap fx.

Since the structure of the privacy film 100 of the splice panel 1000 of this embodiment is similar to or same as that of the privacy film 100 of any of the above embodiments, details are not described herein. For details, references are made to the specific contents of each of the above embodiments.

Alternatively, the first panel p1 may be, but is not limited to, a liquid crystal display panel. The light-emitting side of the first panel p1 may also be provided with a light-increasing film.

Alternatively, the second panel p2 may be a led panel, such as a miniature led panel (Micro-LED panel), a sub-millimeter level led panel (Mini-LED panel), a quantum dot led panel (Q-LED panel), or an organic light-emitting diode panel (OLED panel).

Figure 17:
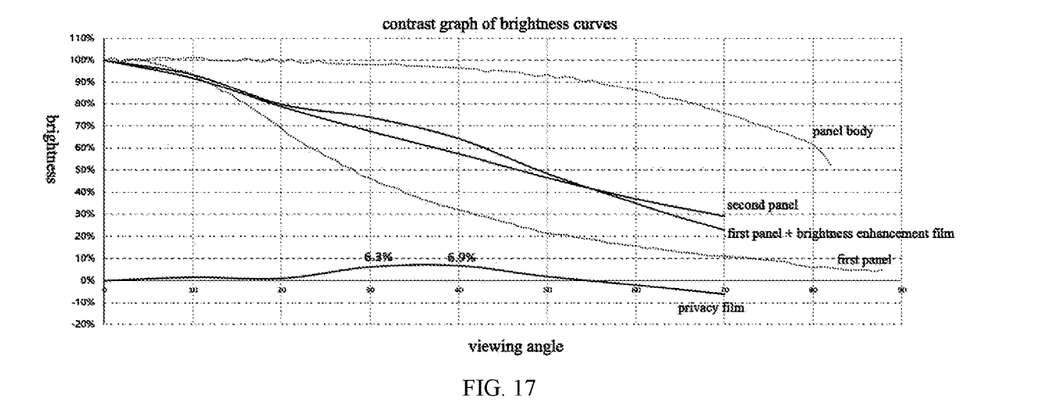
FIG. 17 is a curve graph of viewing angle-brightness of a first panel, a panel body, a first panel+a brightness enhancement film, a second panel (panel body+a privacy film of the first embodiment), and a privacy film in a splice panel according to an embodiment of the present application.

When the second panel p2 includes the peephole film 100 of the first embodiment, referring to FIG. 17, the curve of the first panel p1 with the light-increasing film substantially coincides with the curve of the second panel p2 from the viewing angles ranging from 0 to 20 degrees. From the viewing angles ranging from 20 to 55 degrees approximately, the difference in brightness between the curves increases first and then decreases to be coincided. After the viewing angle of 55 degrees, the difference in brightness gradually increases. However, the curve of the second panel p2 without the privacy film is already very close to the curve of the first panel p1.

Figure 18:
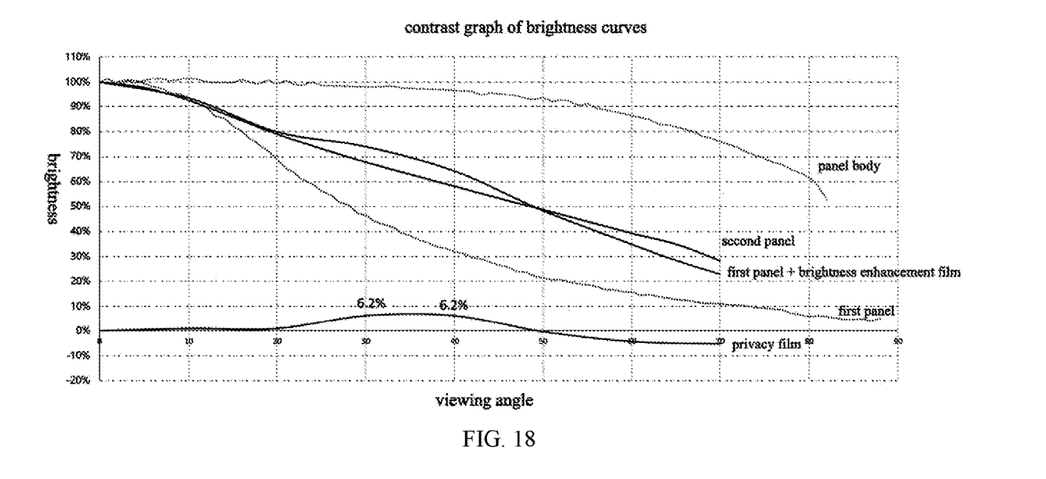
FIG. 18 is a curve graph of viewing angle-brightness of a first panel, a panel body, a first panel+a brightness enhancement film, a second panel (panel body+a privacy film of the third embodiment), and a privacy film in a splice panel according to an embodiment of the present application.

When the second panel p2 includes the peephole film 100 of the first embodiment, referring to FIG. 18, the curve of the first panel p1 with the light-increasing film substantially coincides with the curve of the second panel p2 from the viewing angles ranging from 0 to 20 degrees. From the viewing angles ranging from 20 to 50 degrees approximately, the difference in brightness between the curves increases first and then decreases to be coincided, but the difference extent is less than the first embodiment. After the viewing angle of 50 degrees, the difference in brightness gradually increases. However, the curve of the second panel p2 without the privacy film is already very close to the curve of the first panel p1.

Figure 19:
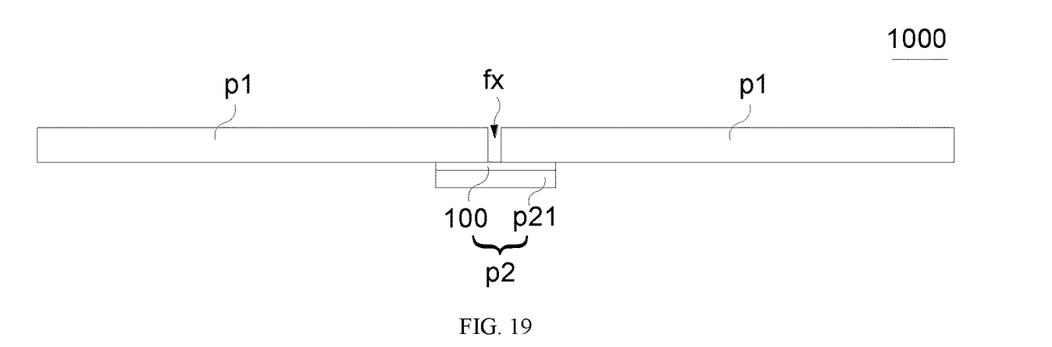
FIG. 19 is another schematic structural diagram of a splice panel according to an embodiment of the present application.

In some embodiments, referring to FIG. 19, the second panel p2 may also be disposed on the light-emitting surfaces of two adjacent first panels p1.

It should be noted that the light-entering surface is disposed opposite to the light-emitting surface. That is, the light-emitting surface is a front surface of the first panel p1, and the light-entering surface is a rear surface of the first panel p1.

Alternatively, the second panel p2 is disposed in a non-display area of the first panel p1. A portion of the second panel p2 corresponding to the non-display area is transparent.

The second panel p2 is disposed on the rear side of the first panel p1. Since the film layers of the non-display area of the first panel p1 has a certain light consumption, the light emission brightness of the second panel p2 is reduced, and the number of gratings 12 provided in the privacy film 100 is reduced, thereby reducing the difficulty in producing the privacy film.

A splice panel 100 of an embodiment of the present application includes a plurality of grating units 12 having a plurality gratings gs spaced apart, and the plurality of grating units 12 are arranged. Since the gratings gs are spaced apart, the optical channels td are formed among the grating units 12. As such, the side-view brightness is reduced, the side-view brightness is ensured not to be zero, that is, the side-view display effect is ensured. In addition, the two adjacent grating units 12 share at least one grating gs, so that the layout space of the grating gs can be saved to provide more grating gs, and the front-view brightness can be further reduced.

The above describes in detail a privacy film and a splice panel provided by the embodiments of this application. The principles and implementation of this application are described by applying specific examples. The description of the above embodiments is only used to help understand the method and core idea of this application. At the same time, for those skilled in the art, according to the idea of the present application, there will be some changes in specific embodiments and application scope. In conclusion, the contents of the present specification shall not be construed as limiting the present application.

What is claimed is:

1. A privacy film, comprising:
a substrate; and
a plurality of grating units disposed on the substrate on a same layer, wherein each of the plurality of grating units comprise a plurality of gratings;
wherein in the grating unit, the plurality of gratings are spaced apart, and the plurality of gratings are sequentially arranged to form a polygonal structure;
wherein two adjacent grating units share at least one grating.

2. The privacy film of claim 1, wherein a grating shared by two adjacent grating units is a common grating;
the grating unit includes a first grating and a second grating, the first grating is adjacent to an end of the common grating, and the second grating is adjacent to another end of the common grating;
in two adjacent said grating units, a first opening is provided between two adjacent first gratings, and a second opening is provided between two adjacent second gratings; and
the common grating is correspondingly disposed between the first opening and the second opening, and the first opening and the second opening at least partially correspond to form an optical channel.

3. The privacy film of claim 2, wherein a width of the common grating is less than a width of the first opening and a width of the second opening.

4. The privacy film of claim 3, wherein the first opening has a first center, the second opening has a second center, and a line connecting the first center and the second center closest to the first center coincides with a central axis of an extending direction of the common grating.

5. The privacy film of claim 4, wherein the width of the first opening is equal to the width of the second opening.

6. The privacy film of claim 5, wherein in a same grating unit, a distance is provided between two adjacent gratings, and any two distances are equal; wherein the plurality of gratings are sequentially arranged to form a regular polygonal structure.

7. The privacy film of claim 6, wherein the plurality of grating units comprise a plurality of first grating units and a plurality of second grating units; wherein in each of the plurality of first grating units, the plurality of gratings are sequentially arranged to form an inverted equilateral triangle structure; wherein in each of the plurality of second grating units, the plurality of gratings are sequentially arranged to form an equilateral triangle structure;

wherein the first grating units and the second grating units are alternately arranged in a first direction; and the first grating units and the second grating units are alternately arranged in a second direction intersecting the first direction;

wherein the first grating unit and the second grating unit share at least one grating.

8. The privacy film of claim 7, wherein the plurality of gratings include a plurality of first arrangement gratings, a plurality of second arrangement gratings, and a plurality of third arrangement gratings;

wherein in the first direction, extending directions of the first arrangement gratings are parallel to the first direction, and the plurality of first arrangement gratings are spaced apart; in a third direction intersecting the first direction, extending directions of the second arrangement gratings are parallel to the third direction, and the plurality of second arrangement gratings are spaced apart; in a fourth direction intersecting the third direction, extending directions of the third arrangement gratings are parallel to the fourth direction, and the plurality of third arrangement gratings are spaced apart;

wherein in the first direction, the optical channels are provided on both sides of each row of the first arrangement gratings; in the third direction, the optical channels are provided on both sides of each row of the second arrangement gratings; and in the fourth direction, the optical channels are provided on both sides of each row of the third arrangement gratings.

9. The privacy film of claim 6, wherein in the grating unit, the plurality of gratings are sequentially arranged to form a square structure;

wherein in a first direction, the plurality of grating units are spaced apart; and in a second direction perpendicular to the first direction, the plurality of grating units are spaced apart;

wherein in the first direction and the second direction, two adjacent grating units share at least one grating.

10. The privacy film of claim 9, wherein the plurality of gratings include a plurality of first arrangement gratings and a plurality of second arrangement gratings, wherein in a first direction, extension directions of the first arrangement gratings are parallel to the first direction, and the plurality of first arrangement gratings are spaced apart; wherein in a second direction, extending directions of the second arrangement gratings are parallel to the second direction, and the plurality of second arrangement gratings are spaced apart;

wherein in the first direction, the optical channels are provided on both sides of each row of the first arrangement gratings; in the second direction, the optical channels are provided on both sides of each row of the second arrangement gratings; in a third direction intersecting the second direction, the optical channels are disposed between the first arrangement gratings and the second arrangement gratings; in a fourth direction perpendicular to the third direction, the optical channels are disposed between the first arrangement gratings and the second arrangement gratings.

11. The privacy film of claim 6, wherein in the grating unit, the plurality of gratings are sequentially arranged to form a regular hexagonal structure; and the plurality of grating units include a plurality of first grating units and a plurality of second grating units;

wherein the first grating units and the second grating units are alternately arranged in a first direction, and the first grating units and the second grating units are partially overlapped and relatively offset; wherein the plurality of first grating units and the plurality of second grating units are arranged in a second direction perpendicular to the first direction;

wherein in the first direction, the first grating unit and the second grating share at least one grating; and in the second direction, two adjacent first grating units share at least one grating, and two adjacent second grating units share at least one grating.

12. The privacy film of claim 11, wherein the plurality of gratings include a plurality of first arrangement gratings, a plurality of second arrangement gratings, and a plurality of third arrangement gratings;

wherein in the first direction, extending directions of the first arrangement gratings are parallel to the first direction, and the plurality of first arrangement gratings are spaced apart; and in the second direction, the plurality of first arrangement gratings are spaced apart;

wherein in a third direction intersecting the first direction, extending directions of the second arrangement gratings are parallel to the third direction, and the plurality of second arrangement gratings are spaced apart; and in a fourth direction perpendicular to the third direction, the plurality of second arrangement gratings are spaced apart;

wherein in a fifth direction intersecting the first direction, extending directions of the third arrangement gratings are parallel to the fifth direction, and the plurality of third arrangement gratings are spaced apart; and in a sixth direction perpendicular to the fifth direction, the plurality of third arrangement gratings are spaced apart;

wherein in the first direction, the optical channels are provided on both sides of each row of the first arrangement gratings; in the second direction, the optical channels are provided on both sides of each row of the first arrangement gratings; in the third direction, the optical channels are provided on both sides of each row of the second arrangement gratings; in the fourth direction, the optical channels are provided on both sides of each row of the second arrangement gratings; in the fifth direction, the optical channels are provided on both sides of each row of the third arrangement gratings; and in the sixth direction, the optical channels are provided on both sides of each row of the third arrangement gratings.

13. The privacy film of claim 5, wherein in a same grating unit, a distance is provided between two adjacent gratings; and the plurality of gratings are sequentially arranged to form a rhombic structure.

14. The privacy film of claim 13, wherein the plurality of grating units comprise a plurality of first grating units and a plurality of second grating units; wherein in each of the plurality of first grating units, the plurality of gratings are sequentially arranged to form a first rhombic structure; and in each of the plurality of second grating units, the plurality of gratings are sequentially arranged to form a second rhombic structure;

wherein the plurality of first grating units and the plurality of second grating units are arranged in a first direction; and the first grating units and the second grating units are alternately arranged in a second direction intersecting the first direction;

wherein in the first direction, two adjacent first grating units share at least one grating, and two adjacent second grating units share at least grating; and in the second direction, the first grating unit shares at least one grating with the second grating unit;

wherein in the second direction, a shape of the first grating unit and a shape of the second grating unit are symmetrical about a central axis of the common grating.

15. The privacy film of claim 14, wherein the plurality of gratings include a plurality of first arrangement gratings, a plurality of second arrangement gratings, and a plurality of third arrangement gratings;
   wherein in the first direction, extending directions of the first arrangement gratings are parallel to the first direction, the plurality of first arrangement gratings are spaced apart, the plurality of second arrangement gratings are spaced apart, and the plurality of third arrangement gratings are spaced apart;
   wherein in a third direction intersecting the first direction, extending directions of the second arrangement gratings are parallel to the third direction, the plurality of first arrangement gratings are spaced apart, and the plurality of second arrangement gratings are spaced apart;
   wherein in a fourth direction intersecting the third direction, extending direction of the third arrangement gratings are parallel to the fourth direction, the plurality of first arrangement gratings are spaced apart, and the plurality of third arrangement gratings are spaced apart;
   wherein in the first direction, the optical channels are provided on both sides of each row of the first arrangement gratings;
   in the third direction, the optical channels are provided on both sides of each row of the second arrangement gratings; and
   in the fourth direction, the optical channels are provided on both sides of each row of the third arrangement gratings.

16. A splice panel, comprising:
   at least two first panels, wherein the at least two first panels are spliced, and a gap is provided between two adjacent first panels; and
   at least one second panel disposed on light-emitting surfaces or light-entering surfaces of two adjacent first panels and blocking the gap;
   wherein the second panel includes a panel body and a privacy film disposed on the panel body; a side-view brightness of the panel body is greater than a side-view brightness of the first panel;
   wherein the privacy film comprises:
   a substrate; and
   a plurality of grating units disposed on the substrate on a same layer, wherein each of the plurality of grating units comprise a plurality of gratings;
   wherein in the grating unit, the plurality of gratings are spaced apart, and the plurality of gratings are sequentially arranged to form a polygonal structure;
   wherein two adjacent grating units share at least one grating; and a grating shared by two adjacent grating units is a common grating;
   the grating unit includes a first grating and a second grating, the first grating is adjacent to an end of the common grating, and the second grating is adjacent to another end of the common grating;
   in two adjacent said grating units, a first opening is provided between two adjacent first gratings, and a second opening is provided between two adjacent second gratings;
   the common grating is correspondingly disposed between the first opening and the second opening, and the first opening and the second opening at least partially correspond to form an optical channel;
   an extending direction of the optical channel is intersected with an extending direction of the gap.

17. The splice panel of claim 16, wherein a width of the common grating is less than a width of the first opening and a width of the second opening.

18. The splice panel of claim 17, wherein the first opening has a first center, the second opening has a second center, and a line connecting the first center and the second center closest to the first center coincides with a central axis of an extending direction of the common grating.

19. The splice panel of claim 18, wherein the width of the first opening is equal to the width of the second opening.

20. The splice panel of claim 19, wherein in a same grating unit, a distance is provided between two adjacent gratings, and any two distances are equal; wherein the plurality of gratings are sequentially arranged to form a regular polygonal structure.

* * * * *